US005535336A

United States Patent [19]
Smith et al.

[11] Patent Number: 5,535,336
[45] Date of Patent: Jul. 9, 1996

[54] APPARATUS AND METHOD FOR ENABLING A NETWORK INTERFACE TO DYNAMICALLY ASSIGN AN ADDRESS TO A CONNECTED COMPUTER AND TO ESTABLISH A VIRTUAL CIRCUIT WITH ANOTHER NETWORK INTERFACE

[75] Inventors: Ralph S. Smith, Forest Grove, Oreg.; William J. Kruegeer, Redmond, Wash.

[73] Assignee: Intel Corporation, Santa Clara, Calif.

[21] Appl. No.: 431,477

[22] Filed: May 1, 1995

Related U.S. Application Data

[63] Continuation of Ser. No. 97,327, Jul. 26, 1993, abandoned, which is a continuation of Ser. No. 939,399, Aug. 31, 1992, abandoned, which is a continuation of Ser. No. 585,309, Sep. 19, 1990, abandoned.

[51] Int. Cl.$^6$ ................................................ G06F 13/00
[52] U.S. Cl. .................................. 395/200.06; 395/200.1; 395/200.12; 395/200.2; 395/829; 340/825.07; 340/825.52; 364/DIG. 1; 364/239.9; 364/242.92; 364/242.94; 364/242.95
[58] Field of Search ...................... 340/825.07, 825.52; 370/85.4, 85.5, 85.45; 395/200, 275, 325, 800, 200.06, 200.1, 200.12, 200.2, 828, 829, 284

[56] References Cited

U.S. PATENT DOCUMENTS

| | | | |
|---|---|---|---|
| 4,281,380 | 7/1981 | DeMesa, III et al. | 304/200 |
| 4,380,052 | 4/1983 | Shima | 395/325 |
| 4,423,414 | 12/1983 | Bryant et al. | 340/825.07 |
| 4,430,651 | 2/1984 | Bryant et al. | 340/825.52 |
| 4,480,307 | 10/1984 | Budde et al. | 395/325 |
| 4,551,721 | 11/1985 | Kozuk | 340/825.52 |
| 4,562,535 | 12/1985 | Vincent et al. | 395/325 |
| 4,590,468 | 5/1986 | Stieglitz | 340/825.5 |
| 4,642,758 | 2/1987 | Teng | 364/200 |
| 4,660,141 | 4/1987 | Ceccon et al. | 395/275 |
| 4,660,169 | 4/1987 | Norgren et al. | 395/325 |
| 4,667,323 | 5/1987 | Engdahl et al. | 370/85 |
| 4,720,784 | 1/1988 | Radhakrishnan et al. | 364/200 |
| 4,727,475 | 2/1988 | Kiremidjian | 395/325 |
| 4,730,251 | 3/1988 | Aakre et al. | 395/325 |

(List continued on next page.)

OTHER PUBLICATIONS

Rosenberg, "Dictionary of Computers, Information Processing, and Telecommunications", 2d, 1984, p. 255.
Simoncic, R. et al., "Shipnet: A Real-Time Local Area (List continued on next page.)

*Primary Examiner*—Thomas G. Lee
*Assistant Examiner*—Lance L. Barry
*Attorney, Agent, or Firm*—Blakely, Sokoloff, Taylor & Zafman

[57] ABSTRACT

A network provides the capability for information transfer and resource sharing between a plurality of nodes including computers and peripheral devices. The network is comprised of a plurality of network interfaces coupled together on a network cable in both a daisy chain configuration and a bus configuration. Each node is connected to one of the network interfaces using an interface compatible with each particular node. Each network interface contains logic means for controlling the operation of the network. A means for self-identifying the network address of each node is provided without the need for unique hardware or software in each network interface. One of the network interfaces in the network is self-designated as the network watch dog. The network watch dog performs network error detection and correction. The network provides the capability for nodes to communicate with each other even though their associated interfaces are incompatible. The network also provides a means for performing network protocol conversion necessary in order to allow nodes with incompatible interfaces to communicate. Virtual connections between two nodes may be established whereby uninterrupted information transfer may take place. Particular peripheral devices may be associated with particular computer nodes thereby eliminating the need for a computer node to specify a destination for information transfer. The logic means in each network interface will assign peripheral devices to computers by default.

15 Claims, 6 Drawing Sheets

| | | | |
|---|---|---|---|
| 4,823,122 | 4/1989 | Mann et al. | 340/825.28 |
| 4,833,605 | 5/1989 | Terada et al. | 395/325 |
| 4,856,091 | 8/1989 | Taska | 455/607 |
| 4,899,274 | 2/1990 | Hansen et al. | 355/275 |
| 4,953,162 | 8/1990 | Lyons et al. | 370/94.1 |
| 4,975,830 | 12/1990 | Gerpheide et al. | 395/200 |
| 4,994,926 | 2/1991 | Gordon et al. | 358/400 |
| 5,020,095 | 5/1991 | Morganstein et al. | 376/67 |
| 5,034,878 | 7/1991 | Haapala et al. | 395/325 |
| 5,072,370 | 10/1991 | Durdik | 395/575 |
| 5,125,082 | 6/1992 | Fujiwara | 395/325 |
| 5,150,464 | 9/1992 | Sidhu et al. | 395/200 |
| 5,179,670 | 1/1993 | Farmwald et al. | 395/325 |
| 5,204,669 | 4/1993 | Dorke et al. | 340/825.52 |
| 5,353,413 | 10/1994 | Novanovich et al. | 395/325 |

OTHER PUBLICATIONS

Network for Ships." Local Computer Networks, 1988 13th Conference, p. 426.

Pattinson, C. et al., "Connection–Oriented and Connection-less Communications Protocols" Or Teletraffic Symposium, 1989, 6 & 7 IEE p. 13/1.

Rodrigues, M. et al., "Performance Analysis of a LAN/WAN Bridging Architecture." 1989 IEEE International Communications Conference, p. 20.6.1.

APPARATUS AND METHOD FOR ENABLING A NETWORK INTERFACE TO DYNAMICALLY ASSIGN AN ADDRESS TO A CONNECTED COMPUTER AND TO ESTABLISH A VIRTUAL CIRCUIT WITH ANOTHER NETWORK INTERFACE

This is a continuation of application Ser. No. 08/097,327, filed Jul. 26, 1993, and now abandoned; which is a continuation of Ser. No. 07/939,399, filed Aug. 31, 1992, and now abandoned; which is a continuation of Ser. No. 07/585,309, filed Sep. 19, 1990, and now abandoned.

BACKGROUND OF THE INVENTION

(1) Field of the Invention

This invention relates to computer networking systems. Specifically, the field of the present invention is that of computer systems where computers and computer peripherals (nodes) are interconnected on a network allowing the transfer of data and control information between nodes on the network.

(2) Prior Art

The capabilities of information processing and computer systems has been greatly enhanced by the use of networking. Networking in the prior art has provided the capability to interconnect computers and computer peripherals, thereby providing information transfer between these network components (nodes). Typically, however, nodes on prior art network must be equipped with an interface compatible with the network interface protocol. This requirement leads to the need for a particular node to support more than one type of interface. For example, if a computer is required to communicate with both a printer using parallel data communications and a modem using serial data communications, the computer must support both a serial and a parallel interface. Moreover, in a network containing both nodes using parallel and serial data transmission, the parallel nodes cannot communicate with the serial nodes.

Another problem exists in the prior art when determining the identity of each of the nodes connected to the network. Typically, the identity of a particular node must be established either by intervention from the user or through an identification code stored in unique hardware in each node. Networks where nodes are identified by the user are difficult to reconfigure, since the user must also reconfigure the identity of the nodes. Networks with nodes requiring unique hardware cause problems in the manufacture and configuration control of the unique hardware components.

Thus, a new network scheme is required for allowing common access to devices with dissimilar hardware interfaces.

SUMMARY OF THE INVENTION

The present invention is a network system providing a common interface to existing dissimilar hardware interfaces. Interfaces such as parallel printer, serial printer, serial plotter, serial modem, or other devices may be interconnected and shared via the network of the present invention. The present invention enables networked host computers to share the same parallel or serial peripheral devices using network hardware and software present in a network device (network interface) of the present invention rather than occupying a slot within the host computer. The host computer interface may be different than the interface provided by a peripheral device with which the host computer needs to communicate. Similarly, one host computer may communicate with another host computer over the network of the present invention.

In a preferred embodiment of the present invention, the network is coupled with a six-conductor network cable connecting a plurality of network interfaces. Each network interface is used to connect the network cable to an input/output (I/O) connector in a host computer or network peripheral device. Network interfaces also provide the capability to connect a host computer or network peripheral device to the network using either a parallel or serial data transfer means.

Network interfaces have three connectors: a pair of RJ-11 (six-wire) connectors and a DB-25 (serial) or a Centronix-type (parallel) connector. The pair of RJ-11 connectors is used to connect the network interface to the six-conductor network cable. One RJ-11 connector provides the input side of the network interface. The other RJ-11 connector supports the output side of the network interface. The serial or parallel connector is used to connect the network interface to the host computer or peripheral device. It will be apparent to those skilled in the art that other types of interfaces may be supported by the network of the present invention.

There are two types of network interfaces in the present invention: source network interfaces and destination network interfaces. A source network interface is used to connect the network with a parallel or serial port on the host computer. A device connected to a source network interface is predominantly, but not exclusively, a data transmitter. The destination network interface is used to connect the network to a parallel or serial port on a printer, plotter or modem. Devices connected to a destination network interface are predominantly, but not exclusively, data receivers.

The network of the present invention also provides a capability for virtual circuits. A virtual circuit is a logical connection between a pair of network interfaces. This logical connection allows a node to gain uninterrupted access to another node for the transfer of a large block of data. A virtual circuit exists on the network for a specific period of time only. The virtual circuit is subject to termination after a "time out" period if the source network interface that created the virtual circuit either ceases to communicate with the host computer to which it is attached, or is commanded to terminate by a software agent running on the host computer to which it is attached. Multiple virtual circuits may exist between network interface pairs on the network simultaneously.

All network interfaces of the present invention are connected to one another using both a bus configuration and a daisy chain arrangement where a first network interface's RJ-11 output connector is connected to a second network interface's RJ-11 input connector. Succeeding network interfaces are always connected output to input. The cable connecting each network interface contains six wires. Two of the wires are used to pass data between network interfaces in a bus configuration. Another two wires are used to transfer self-configuration signals between network interfaces in a daisy-chain configuration. The last two wires provide a path for power and ground.

Power is supplied to the network through a physical connection between one of the network interfaces in the network to an external power source. Power is connected to an RJ-11 input connector on one network interface. More than one network interface in the network may be connected to an external power source; however, only one network interface is required to be externally powered.

A network interface in the network of the present invention has the ability to determine its own identity (address) without the use of additional host software, unique hardware, or without any intervention by a user. The self-identification (self ID) logic is actually part of the firmware located in each network interface. This logic accesses other network interfaces in the network to determine the network topology. The first network interface in the network can always be established as the network interface connected to an external power source with no other network interface connected to its input. Once the first network interface is established, the identity of the other network interfaces in the network can be referenced to the first network interface. In this way, the network topology can be established at initial power-up or any time the network is reconfigured. Once the network configuration is established, each network interface is able to dynamically assign its own unique network identification code. As network interfaces within the network are added, removed, or reconfigured, the network interfaces in the network are able to dynamically reallocate their network identification address.

Once the power-up initialization sequence and self-identification procedure has been completed, the identity of each network interface in the network has been established. The identification of each network interface is known as a network interface address. Each network interface in the network knows its own address. Each source network interface in the network also knows the network interface address of all other network interfaces in the network. Each source network interface also knows the type of the other network interfaces in the network. For example, each source network interface knows the network interface address of all serial and/or parallel printers in the network.

The first network interface in the network acts as a network watch dog. In the watch dog role, the first network interface maintains a timer that initiates an error recovery procedure if any one network interface monopolizes the network for too long a period. All network interfaces in the network contain the hardware and software components necessary to support the watch dog function; however, the first network interface in a particular network is the only network interface using the watch dog components.

Once the power-up initialization sequence has been completed, the operation of the network enters a normal operation mode. During normal operations, all network interfaces on the network are able to receive commands passed across the network from other network interfaces. At any moment, only one network interface will have the right to transmit data on the network. Although any network interface may be a receiver, all network interfaces are set up to recognize only data sent to its own particular network interface address. The first network interface, in order to support its watch dog role, is set to recognize data sent to any network interface. Other network interfaces, not acting as watch dog, will ignore data being passed along the network destined for a different network interface.

A network interface gains the right to transmit data over the network by receiving and holding a transmit authority command. The transmit authority command is an information packet initiated during the power-up sequence and circulated around the network from one network interface to the next. Any time a network interface receives a transmit authority command, the transmit authority command will simply be passed on to the next network interface in the network if the network interface currently holding transmit authority has no pending request to transmit data on the network. If the network interface currently holding transmit authority (typically a source network interface) does have a pending request to transmit data over the network to a destination network interface, the source network interface creates a virtual circuit with a destination network interface. Virtual circuits are described below. Once the virtual circuit is established, the transmit authority command is passed on to the next network interface in the network. The watch dog network interface will prevent any network interface from holding the transmit authority command for too long a period.

The network of the present invention also provides virtual circuits. A virtual circuit is created when a source network interface transmits a listen request command to a destination network interface on the network. A listen request command is an information packet sent over the network. Once the listen request command is received and acknowledged by the destination network interface, information may be sent from the source network interface to the destination network interface over the network. After the virtual circuit is established, the source network interface will set a time out counter within the network interface. As long as the source network interface receives information from the computer to which it is attached within the time out interval, the source network interface maintains the virtual circuit between itself and the destination network interface. No other source network interface can communicate with the destination network interface to which it is paired during this time. As long as the source and destination network interfaces exchange data and status information, the source and destination network interfaces remain virtually connected. In order to prevent a source network interface from monopolizing the network, the source network interface passes its transmit authority command to the next network interface so that other network interfaces may also be allowed to send and receive data. The transmit authority command thus keeps circulating constantly through the network interfaces in the network.

Once the source network interface stops receiving data from its associated host computer, the source network interface will time out and break the virtual circuit. The destination network interface will then appear ready to all other source network interfaces in the network. The destination network interface can then accept data from a new source network interface from anywhere on the network.

The network of the present invention may operate without the benefit of software resident in one of the host computers connected to the network. In operating without host computer resident software, the network provides a default operation mode. In default operation mode the network associates groups of host computers with network peripherals, such as printers, plotters or modems. Thus, in this mode, a host computer and its associated source network interface does not have to explicitly specify the destination network interface to which data is being transmitted. The identity of a default destination network interface is assigned by the source network interface operating in default operation mode.

The present invention also provides a means for performing network protocol conversion. Since computers and peripherals can be connected to the network using serial or parallel interfaces, each network interface has the capability to convert a serial data transmission to a parallel data transmission, and vice versa. For example, a host computer may be connected to the network via a parallel network interface and communicating with a printer connected to the network via a serial network interface. In this situation, the network interface must convert data and status information from one interface protocol to another. This conversion is not trivial, since there is no equivalent hardware status for most of the status bits in the RS-232 (serial) and Centronix (parallel) connectors. The network interfaces in the present invention synthesize and translate the status information from one interface protocol to another.

DETAILED DESCRIPTION OF THE INVENTION

Figure 1:
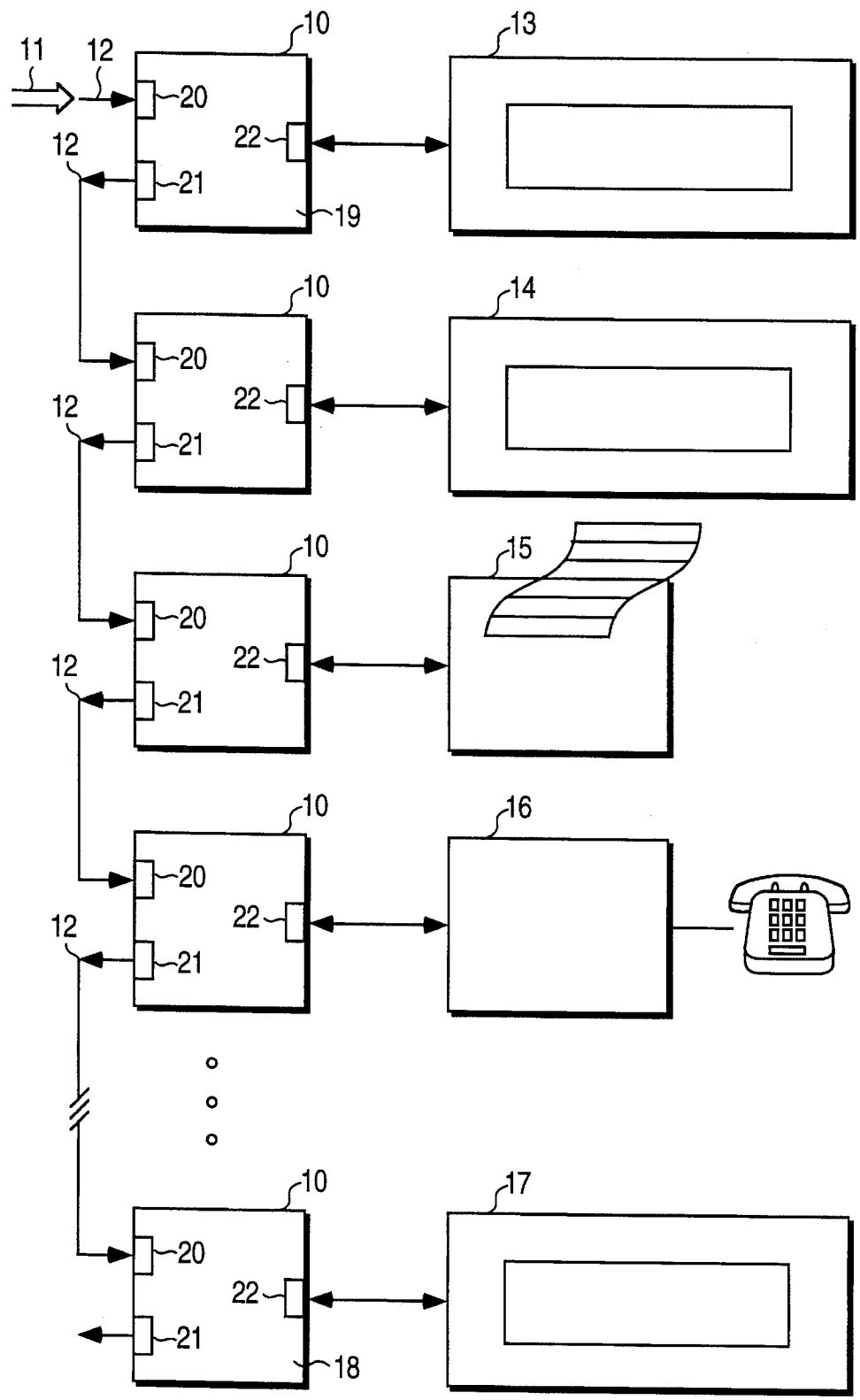
FIG. 1 is an illustration of the network architecture.

The network of the present invention is comprised of a plurality of network interfaces 10 connected to a cable 12 as depicted in FIG. 1. Each network interface 10 is an electronic device containing hardware components and firmware logic described below. Network interfaces 10 each contain three connectors, 20, 21 and 22. Connectors 20 and 21 are RJ-11 type, six pin connectors. Connector 22 can be one of several different types of connectors, depending upon the type of host computer (computer node) or peripheral device (peripheral node) to which the network interface will be connected. For example, the connector 22 may be a female DB-25 type connector for interfacing with a serial device, a male 25-pin Centronix-type connector for interfacing with a parallel device, or a connector for interfacing with the APPLETALK™ network manufactured by Apple Computer, Inc., Cupertino, Calif. APPLETALK is a trademark of Apple Computer, Inc. Although the use of trademarks is permissible in patent applications, the proprietary nature of the marks should be respected and every effort made to prevent their use in any manner which might adversely affect their validity as trademarks. It is apparent to those skilled in the art that other types of interfaces may be easily incorporated into the network of the present invention.

In a preferred embodiment of the present invention, network interfaces 10 are connected via a six-conductor cable 12. Each conductor in the cable 12 is typically a 20 gauge wire. The cable 12 does not need to be shielded. The cable 12 is connected from the output connector 21 of one network interface to the input connector 20 of the next network interface in line. Each network interface 10 is thus connected in a daisy chain configuration from output connector 21 to input connector 20. The last network interface 18 in the daisy chain has no connection at its output connector 21. No termination device for the last network interface is required. The first network interface 19 in the chain has its input connector 20 connected to an external power source 11. The external power source 11 can be a power supply suitable for driving the electronic circuits of the first network interface 19, as well as the remaining network interfaces 10 in the network daisy chain.

Figure 2:
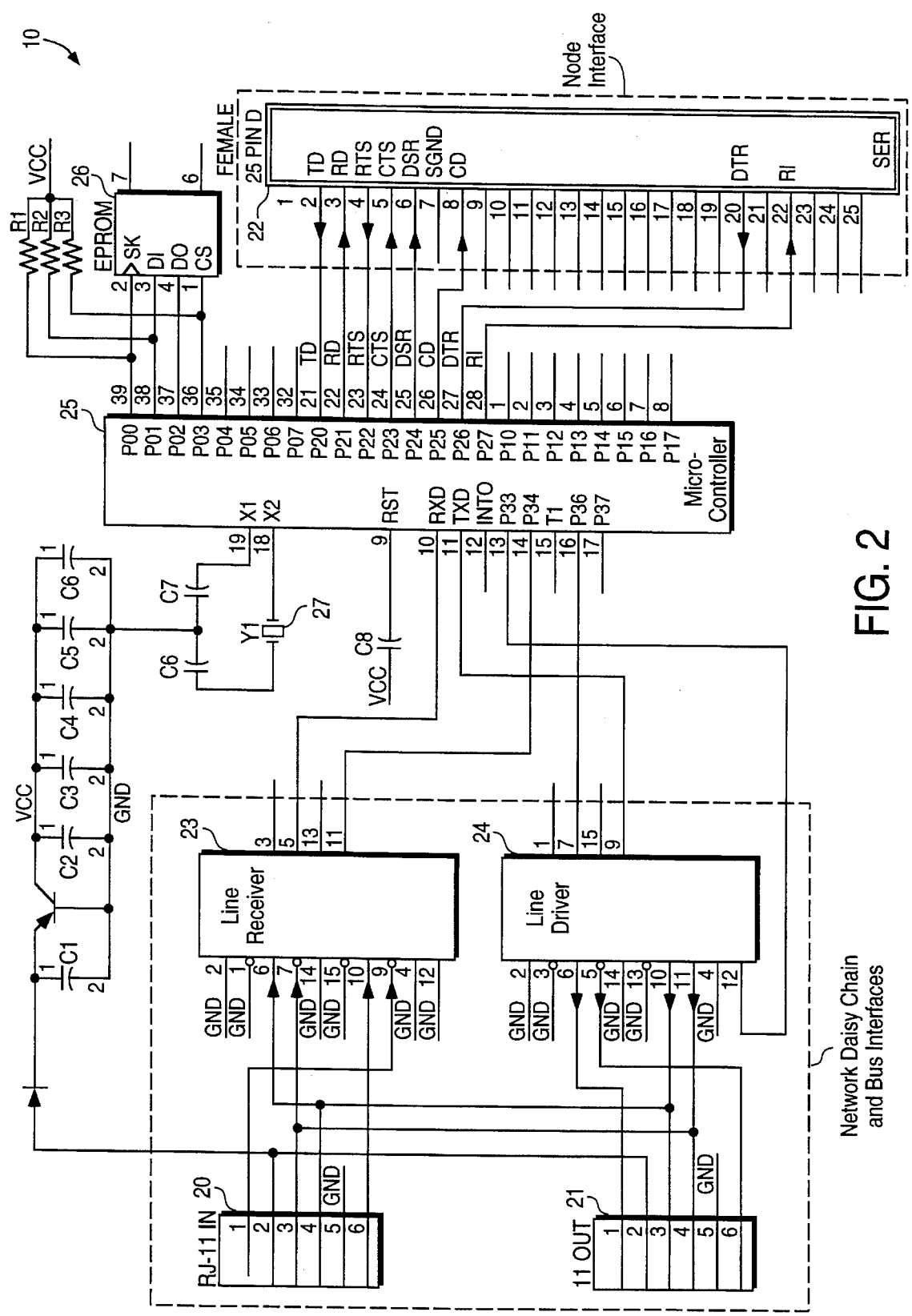
FIG. 2 is a schematic of a serial type network interface of the present invention.
Figure 3:
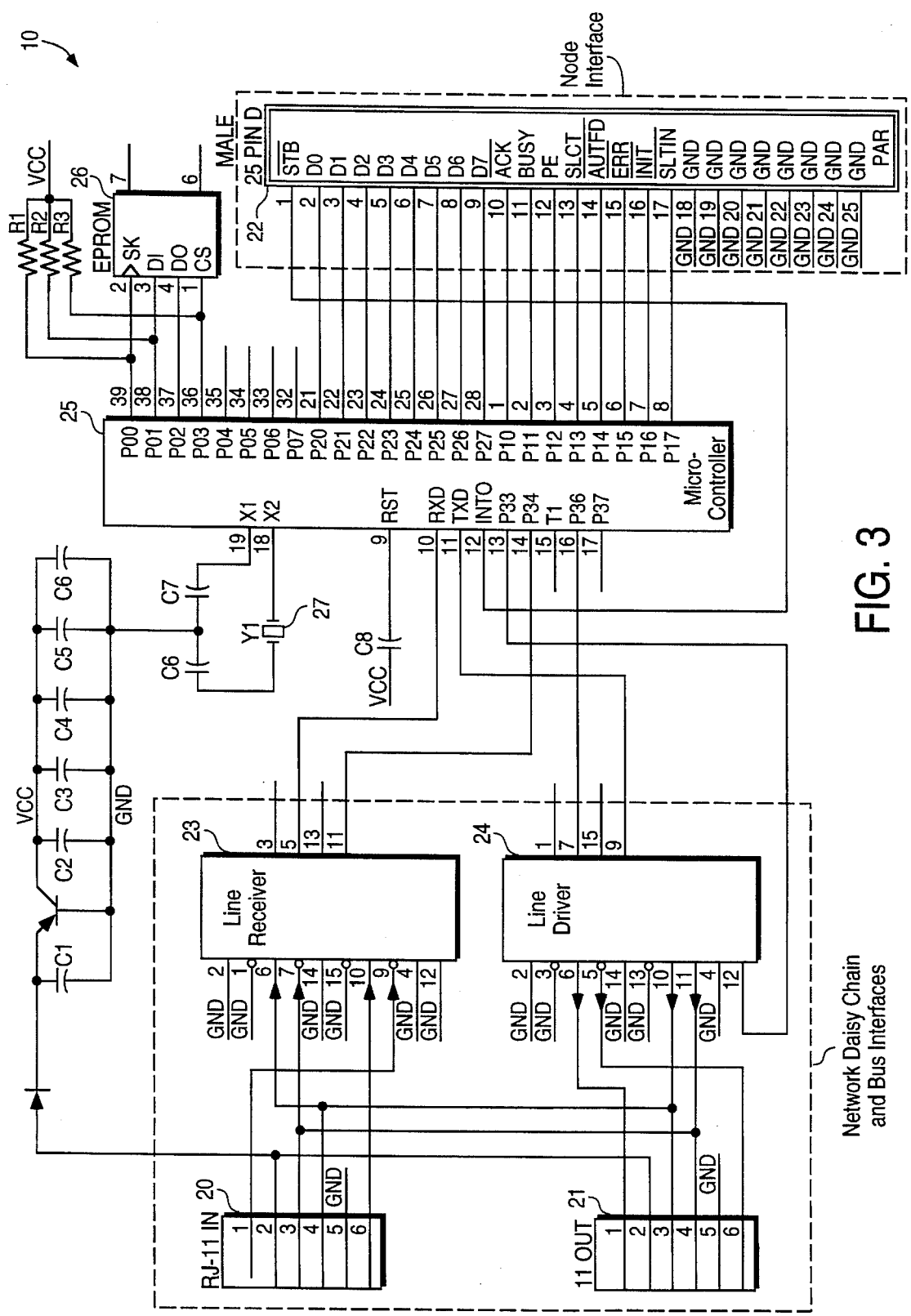
FIG. 3 is a schematic of a parallel type network interface of the present invention.

The circuitry contained within the network interfaces 10 of the present invention is depicted in FIGS. 2 and 3. FIG. 2 illustrates a schematic of a network interface configured to interface with a serial device. FIG. 3 illustrates a schematic of a network interface configured to interface with a parallel device.

Referring to FIG. 2, RJ-11 six pin connectors 20 and 21 are shown. Pin 2 of each connector 20 and 21 supplies power to the network interface 10 from the external power supply 11. This power source 11 is used to drive the VCC pin connection for each of the chip packages contained in this and all of the network interfaces 10 in the network. Similarly, pin 5 in each of the RJ-11 connectors 20 and 21 provides a common ground for each network interface 10. Connector 20 provides the input signals from the network to the network interface. Connector 21 contains output signals from the network interface to the network.

Input signals from connector 20 are connected to a CMOS differential line receiver 23. This line receiver 23 is a standard chip component known in the prior art. One such chip is available from National Semiconductor, Inc. under the part number DS34C86. Line receiver 23 receives four signals from connector 20. Two of the signals appearing on pins 6 and 7 of line receiver 23 are used for receiving control and data information from other network interfaces in the network. Signals presented on pins 9 and 10 of the line receiver 23 are used during the start-up initialization sequence and self-identification process. The signal pair on pins 6 and 7 are used to drive the output on pin 5 from line receiver 23. The signal pair on pins 9 and 10 are used to drive the output on pin 11.

The output on pin 5 from line receiver 23 is connected to the input pin 10 of microcontroller chip 25. The microcontroller 25 is a commonly available chip for programmable control applications. One such microcontroller is manufactured by Intel Corporation, Santa Clara, Calif., under the product designation MCS-51 (8051). Pin 10 of microcontroller 25 is the serial input port for the microcontroller 25. The output signal on pin 11 of line receiver 23 is connected to pin 14 of the microcontroller 25. Pin 14 of microcontroller 25 is a timer (T0) and external counter input used during the initialization start-up and self-identification procedure. When T0 is in the event counter mode, a counter register located inside microcontroller 25 is incremented in response to a 1 to 0 transition at the external input pin 14. The T0 event counter input is used during initialization to determine whether or not the network interface is connected to the power supply, and thus, whether this network interface is the first network interface in the network.

Other connections provide standard inputs to microcontroller chip 25. An oscillator 27 is connected in standard configuration to pins 18 and 19 of microcontroller 25. Pin 18 (XTAL2) and pin 19 (XTAL1) provide a means for clocking the operation of microcontroller 25. This means of clocking the microcontroller is a well known technique in the art. Another input to microcontroller 25 is provided on pin 9. Pin 9 provides a means for supplying a reset signal to microcontroller 25 for resetting the device on initial start-up, or when the operation of the network interface requires a system reset.

Another input is provided to the microcontroller 25 on pin 37. Pin 37 is connected to pin 4 of the 1-bit EPROM 26. EPROM 26 is a commonly available chip used to store information that is retained after the network interface has been powered down (permanent programmable storage). One such chip is manufactured by Hundai Corporation under the product designation HY93C46. EPROM 26 is used in the network interface of the present invention to store configuration code information, such as whether or not the network interface is a serial or parallel network interface, the baud rate of the network interface, and the name that may be specified for a particular network interface. This configuration information is read by the network interface on initial power-up. The other pins of EPROM 26 (pins 1, 2 and 3) are tied high, thus enabling the chip 26 for the output of data to microcontroller 25.

Microcontroller 25 provides four ports for the bi-directional transfer of data. Port 0 is used to read the configuration information from EPROM 26, as previously described. Port 3 is used in the present invention for communicating with other network interfaces in the network via connectors 20 and 21. Ports 1 and 2 are used by the present invention for the transfer of data and control information to the external connector 22. In a serial network interface, only port 2 is necessary for the transfer of control and data. A parallel network interface requires both port 1 and port 2.

Referring again to the serial network interface schematic in FIG. 2, port 2 pins 21–28 of microcontroller 25 are used for the bi-directional transfer of control and data information to the external connector 22. Pin 0 of port 2 (pin 21 of microcontroller 25) is connected to pin 2 of external connector 22.

Pin 2 of external connector 22 carries the transmit data signal (TD) that is transmitted from a host computer to the network interface. Similarly, pins 3–8, 20 and 22 of external connector 22 contain standard RS232 signals well known in the art. The standard RS232 protocol provided at external connector 22 can be configured to interface with a serial computer device or a serial peripheral device. The serial signals provided at external connector 22 are shown in FIG. 2.

Referring to the parallel network interface schematic in FIG. 3, both ports 1 and 2 of microcontroller 25 are used for the transfer of control and data information via external connector 22. Port 1 (pins 1–8 of microcontroller 25) is used for the bi-directional transfer of control information. Port 2 (pins 21–28 of microcontroller 25) is used for the bi-directional parallel transfer of eight bits of data. The signals provided at external connector 22, as shown in FIG. 3, are in standard parallel interface configuration as well known in the art. The parallel interface protocol provided at external connector 22 can be configured to interface with parallel interface computer devices or peripheral devices. Although the network interface-host interface (external connector 22) shown in the preferred embodiment is depicted herein as a serial or parallel interface, other interface configurations are conceivable. For example, an external connector configured for the AppleTalk network protocol can be conveniently configured in the present invention.

Referring again to FIGS. 2 and 3, and specifically to the connections between microcontroller 25 and differential line driver 24, the connections shown are the same for both the serial network interface (FIG. 2) and the parallel network interface (FIG. 3). Line driver 24 is a standard chip component also well known in the art. This chip is also available from National Semiconductor, Inc., under the part number DS34C87. Line driver 24 receives three signals from microcontroller 25. The first signal appears on pin 7 of line driver 24, as connected from pin 16 of microcontroller 25. The signal on pin 7 of line driver 24 is used to drive the output pair on pins 5 and 6 of line driver 24, which are connected to pins 6 and 1, respectively, of RJ-11 connector 21. The signals on pins 5 and 6 of line driver 24 are used during the start-up initialization sequence and self-identification process for each network interface in the network.

The second signal appears at pin 9 of line driver 24 on a connection from pin 11 of microcontroller 25. The signal at pin 9 of line driver 24 is used to drive the signal pair at pins 10 and 11 of line driver 24, which are connected to pins 3 and 4, respectively of RJ-11 connector 21. The signals on lines 10 and 11 of line driver 24 are used during the normal data transfer operations (in a bus configuration) of the network interface.

A third signal is presented at pin 12 of line driver 24 from pin 13 of microcontroller 25. The signal at pin 12 of line driver 24 is the tri-state control signal. The tri-state control signal is used to suppress unwanted output signals from being transmitted over pins 10 and 11 of line driver 24; since, these outputs are connected in a bus configuration. During power-up or when the network interface is not transmitting or receiving data, the tri-state control signal will be set to prevent the network interface from loading the bus.

Thus, line driver 24 is used to drive the two signal pairs (pints 1, 6 and 3, 4) transmitted on the output RJ-11 connector 21. Similar to input RJ-11 connector 20, pin 2 of output RJ-11 connector 21 is connected to the power source as shown in FIGS. 2 and 3. Pin 5 of output RJ-11 connector 21 is connected to a common ground.

Processing Logic of the Present Invention

The present invention provides program logic resident and executed within microcontroller 25. This program logic is necessary to control the operation of the network interface during both the initialization and self-identification sequence and during the normal operation and data transfer sequence. The operation of this program logic during these two sequences is described in the following sections.

Figure 4:
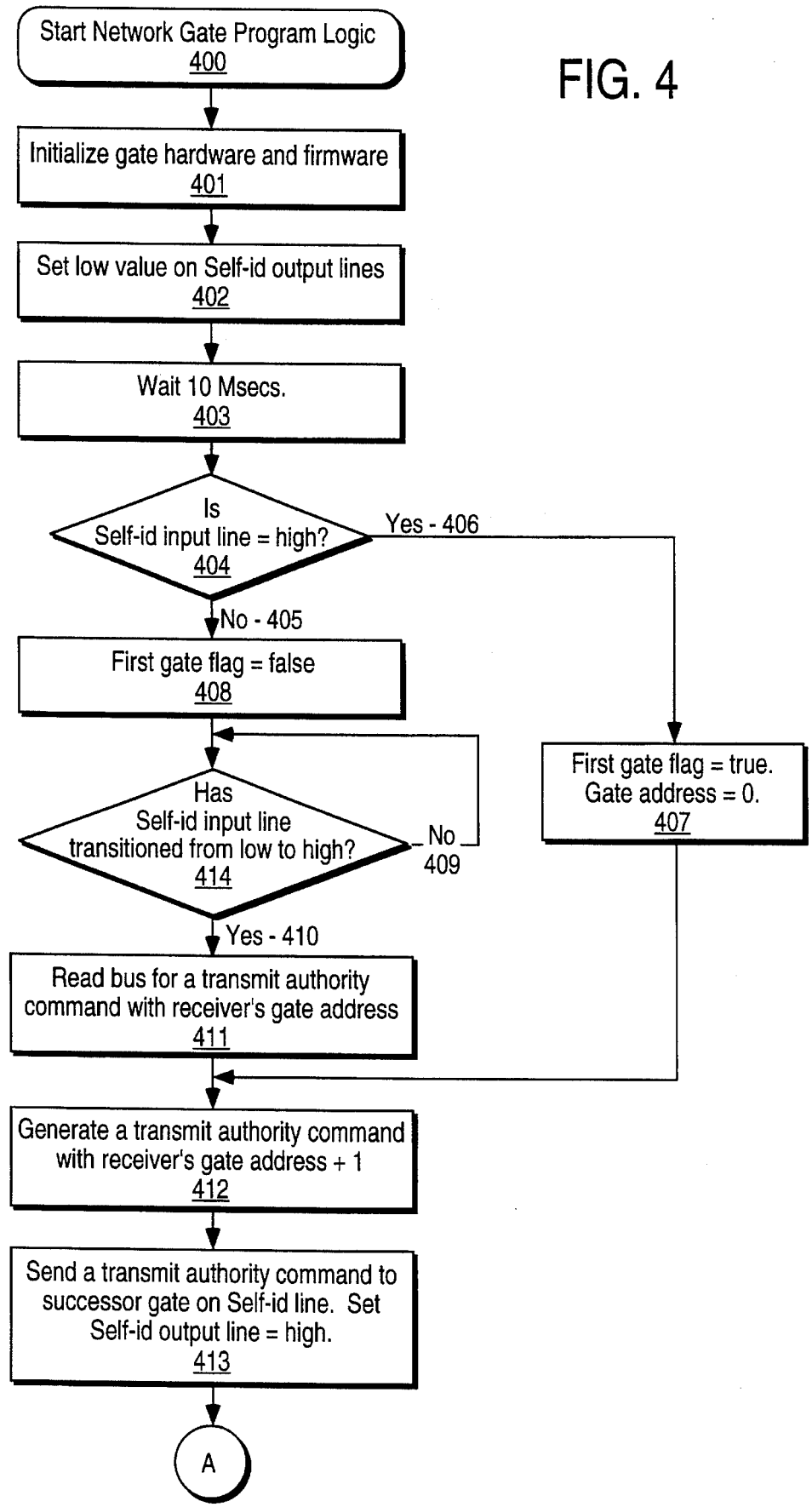
FIGS. 4–6 are flowcharts depicting the firmware logic resident in each network interface.

Referring to the flow chart in FIG. 4, the program logic for the initialization and self-identification sequence is depicted. When power is first applied to the network on pin 2 of the RJ-11 input connector 20 and the RJ-11 output connector 21, the network interface hardware is initialized. Once microcontroller 25 is reset, the program logic of the present invention is executed. The execution of this program logic begins at the box labeled START NETWORK INTERFACE PROGRAM LOGIC (Processing Box 400), as depicted in FIG. 4.

Once the program logic of the present invention receives control, each network interface performs hardware and firmware initialization prior to entering its self-identification state (Processing Box 401). Once in self-identification (self ID) state, the network interface will immediately set the self-identification output lines (pins 1 and 6 of output RJ-11 connector 21) to a low value (Processing Box 402). A low value on the self ID output lines indicates that the network interface is present in the network, but has not completed self-identification. The program logic for each network interface in self-identification mode then begins a 10 millisecond delay (Processing Box 403).

Once the delay has lapsed, the network interface will test the self-identification input lines (pins 1 and 6 of input connector 20) to determine if the self-identification (self ID) input lines are high (Decision Box 404). In the first network interface of the network (address= 0), the self ID input lines are open; therefore, these lines will be interpreted as high (Decision Path 406); since, pin 1 of connector 20 is inverted while pin 6 is not. After 10 milliseconds, all other network interfaces in the network have had the opportunity to initialize themselves and to drive their self-identification output lines low (Decision Path 405). Thus, the first network interface in the network will be able to identify itself, since its self ID input lines will be high after the 10 millisecond time out (Decision Path 406). If this is true, the first network interface flag is set to true and the network interface address is set to zero (Processing Box 407). If the self ID input line is not high (Decision Path 405), the first network interface flag is set to false (Processing Box 408). A test is made to determine if the self ID input line has transitioned from a low to a high value (Decision Box 414). This test allows each network interface in the network to wait for predecessor network interfaces to complete their self-identification process.

Once a predecessor network interface has completed self-identification, its self ID output lines will be set from a low to a high value, thus satisfying the test (Decision Path 410) and allowing control to pass to the next processing box 411. This processing box 411 accomplishes a read of the network interface address sent from the predecessor network interface. The address of the next network interface or successor network interface (address+ 1) in the network is generated (Processing Box 413) and sent to the successor network interface while the self ID output line is set to a high value (Processing Box 412). Thus, the self-identification process ripples from the first network interface in the network through each successive network interface to the last network interface in the network.

Figure 5:
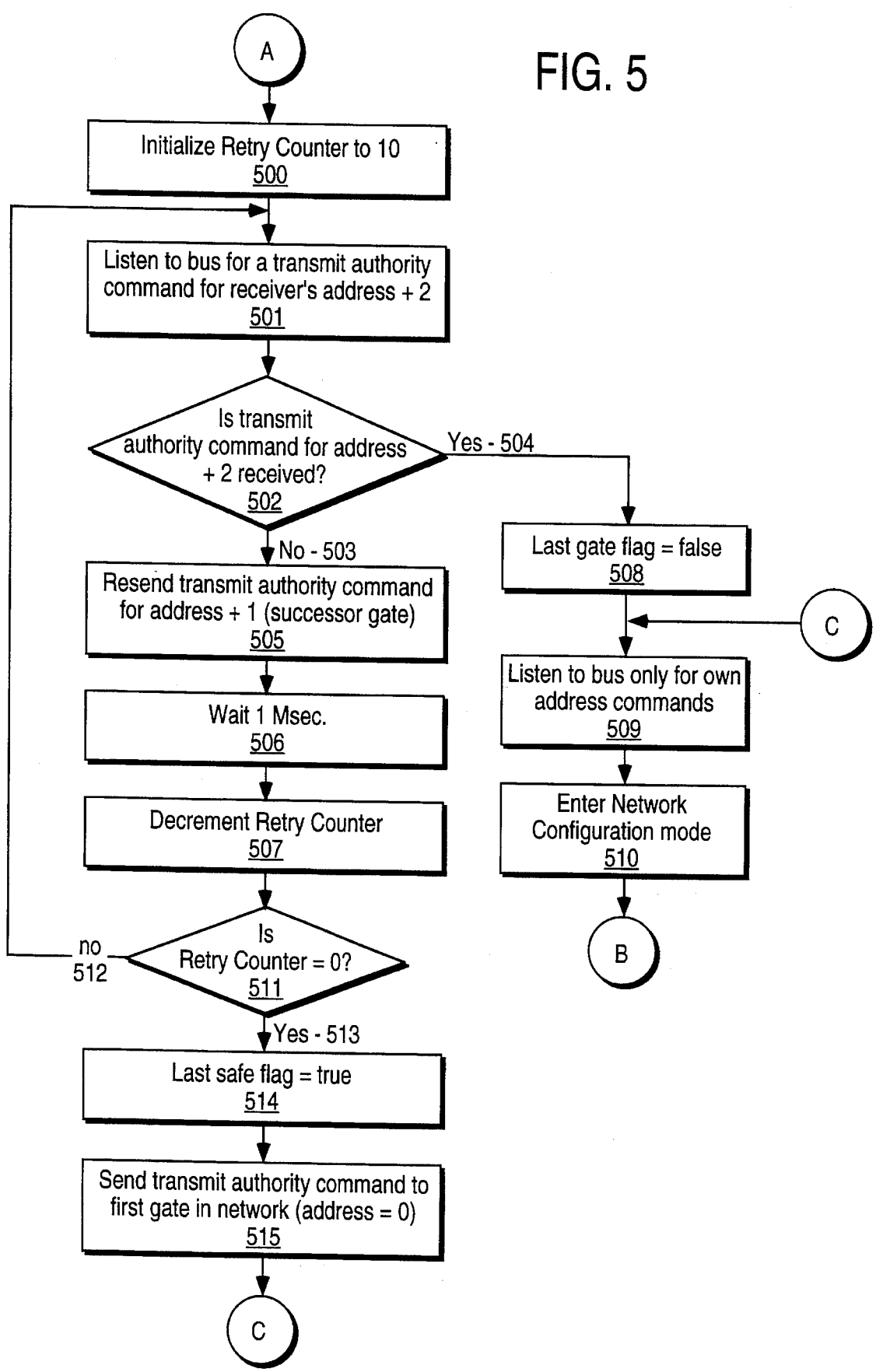

The present invention also provides program logic used by each network interface in determining whether or not the network interface is the last network interface in the network. This processing is depicted in FIG. 5 starting at A. First, a retry counter is initialized to a value of 10 (Processing Box 500). The retry counter is used to specify the number of times that the network interface will attempt to transmit information to a succeeding network interface before declaring the unsuccessful transmitter as the last network interface in the network. A default value of 10 was selected as an arbitrary number of retries; however, other systems may equivalently use other retry values.

Once a network interface initializes its retry counter, the network interface listens to the bus lines (pins 3 and 4 of input connector 20) for a transmit authority command with its network address+ 2 (Processing Box 501). A transmit authority command with the receiver's address+2 could only be generated by that network interface's successor. Thus, if this transmit authority command appears on the bus, a successor network interface must have been present and finished its self-identification process. For example, if a network interface with address 3 is executing at processing box 501, network interface 3 will listen for a transmit authority command addressed to network interface address 5. Network interface 4 (network interface 3's successor network interface) is the only network interface that could have sent a transmit authority command addressed to network interface 5. If the transmit authority command addressed to network interface 5 appears on the network, network interface 3 can confirm that its successor network interface (network interface 4) is present and operating properly. This is true, since network interface 4 generated the transmit authority command addressed to network interface 5. In this way, each network interface can determine whether or not it is the last network interface in the network.

Figure 6:
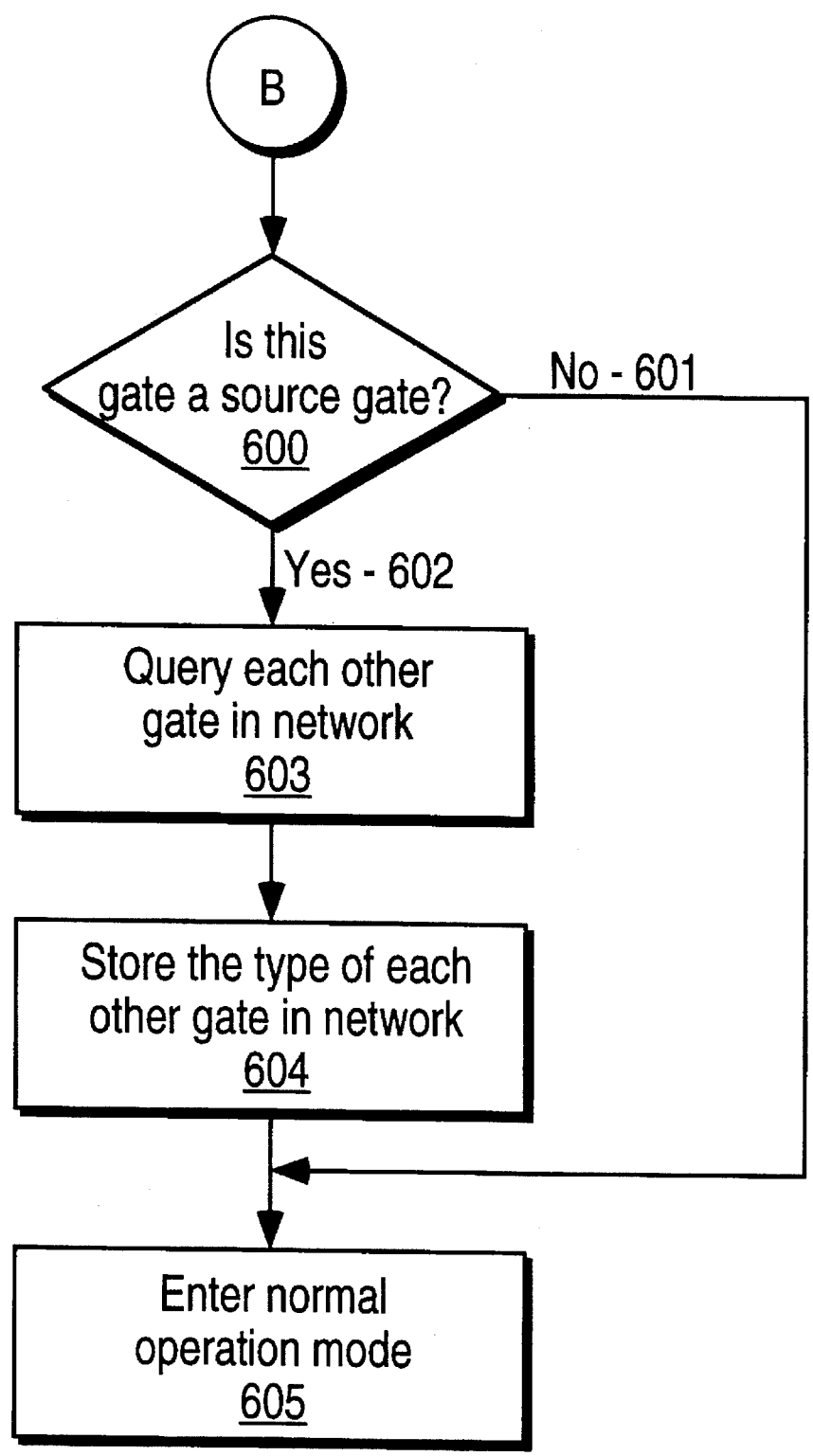

Referring again to FIG. 5, if a transmit authority command with receiver's address+ 2 is received on the bus lines (Decision Path 504), the last network interface flag is set to a value of false (Processing Box 508). Next, the network interface is set to listen to the bus only for commands containing its own address (Processing Box 509). Finally, the network interface enters a network configuration mode (Processing Box 510) and control passes to the program logic starting at B in FIG. 6. If a transmit authority command with receiver's address+ 2 is not received (Decision Path 503), a transmit authority command with transmitter's address+ 1 is sent again (Processing Box 505) in an attempt to activate the successor network interface. The network interface sending the transmit authority command with sender's address+1 then waits for one millisecond (Processing Box 506) to allow the successor network interface time to complete self-identification and generate its transmit authority command for its successor network interface. The retry counter is decremented (Processing Box 507) and tested for a value of zero (Decision Box 511). If the retry counter has not yet reached zero (Decision Path 512), control transfers back to the processing block 501 where the network interface listens to the bus for the transmit authority command with receiver's address+ 2. This cycle will repeat at most ten times until either the retry counter decrements to zero (Decision Path 513) or the transmit authority command with receiver's address+ 2 is finally received (Decision Path 504).

If the retry counter decrements to zero (Decision Path 513), this network interface is assumed to be the last network interface in the network. Thus, the last network interface flag is set to true (Processing Box 514). Next, a transmit authority command is sent to the first network interface in the network (address= 0) in order to close the loop (Processing Box 515). Control transfers to C in FIG. 5. The last network interface will configure itself to listen to the bus only for commands addressed to its own address (Processing Box 509). Finally, the network interface will enter a network configuration mode (Processing Box 510). Control will transfer to B in FIG. 6.

After the initialization and self-identification sequence, each network interface in the network will enter a network configuration state. In this state, each network interface attached to a host computer determines the types of all of the other network interfaces in the network. Network interfaces attached to a host computer are called source network interfaces. A network interface can determine whether or not it is a source network interface by reference to the configuration code information stored in EPROM 26. This configuration information is read and tested with the program logic starting at B in FIG. 6.

If the network interface is not a source network interface (Decision Box 600), then no network configuration processing needs to be performed (Decision Path 601). In this case, the network interface will enter the normal operation mode (Processing Box 605). Normal operation mode of the network is described in the following section.

If this network interface is a source network interface (Decision Path 602), each of the other network interfaces in the network will be queried (Processing Box 603). This is done by sending a status request command packet over the bus addressed to each of the other network interfaces in the network. The status request command is described in detail below. In response, each of the other network interfaces will send a status packet back to the requesting network interface containing the type of the responding network interface. This information is stored within the requesting network interface (Processing Box 604) as network configuration information used while the network interface is in normal operations. Finally, the network interface will enter a normal operation mode (Processing Box 605). The normal operation mode is described next.

Normal Operations

Normal operations in the network involves the transfer of data, status and control information between network interfaces on the network. This information is transferred between network interfaces using command packets. At any one moment, only one network interface on the network will have the authority to transmit information. All network interfaces, with the exception of the first network interface (address 0), will respond only to commands sent to their own network addresses. Network interface address 0 is an exception because it performs the watch dog role described in detail below. Thus, all network interfaces on the network will be able to receive command packets addressed to them and passed across the network. All network interfaces, with the exception of the first network interface (address 0), will ignore command packets being passed across the network that are not addressed to them.

Commands are indicated using the ninth bit of the standard microcontroller 25 protocol. This protocol is well known in the art. Each command is examined by the network interface to which it is addressed and by network interface address 0. The value of the ninth bit will wake up only the microcontroller 25 to which the command is addressed. Therefore, all other network interfaces on the network will remain in sleep mode, thereby reducing their power consumption to a minimum.

A network interface can obtain the right to transmit commands and data over the network by obtaining a transmit authority command. A transmit authority command is an information packet containing a particular transmit authority command code (HANT) addressed to a destination network interface. The transmit authority command is passed around from network interface to network interface, thus enabling each network interface in the network an opportunity to transmit data. Once the transmit authority command is received by a network interface, that network interface may transmit a command packet addressed to another network interface on the network. If a network interface has nothing to send to another network interface, the network interface receiving the transmit authority command simply passes the transmit authority command on to the next network interface in the chain. The transmit authority command will thus circulate around the network from network interface to network interface.

The following section describes commands which can be passed between network interfaces on the network of the present invention. The following list of commands is not exclusive. It will be apparent to those skilled in the art that other commands for specific applications could easily be implemented.

For each command specified below, four elements are described in detail: 1) the command mnemonic, 2) bit pattern, 3) command description, and 4) the response expected to the command. For each command, the bit pattern is divided into three fields: 1) the network interface address field, 2) the command bit field, and 3) the network interface address/data identifier bit field. The network interface address field is a five bit field located in the low-order (right-most) five bits of the command. The network interface address field defines the identity of the network interface to which the command is directed. The command bit field is a three-bit field defining the specific command to perform. The network interface address/data identifier bit is a single bit located in the high-order (left-most) bit position. This bit is used to define whether the lower order eight bits should be interpreted as command or data information.

Network Reset Command

| | Command | | |
|---|---|---|---|
| Mnemonic | Bit Pattern | | Meaning |
| HRESET | 1 \| 111 \| 11111 | | Reset network. Same function as a reset button or unplugging the power supply. |
| Response | | | |
| None | | | |

This command causes all network interfaces to go back into the power up reset sequence. The self-ID determination will start over again. This command is intended to allow new additions to the network and recovery from severe error conditions. This command can only be sent by a network interface having transmit authority. The command can be sent by a network interface that is being controlled by software resident in the host computer to which the network interface is connected.

Network Access Command

| | Command | | |
|---|---|---|---|
| Mnemonic | Bit Pattern | | Meaning |
| HRESET | 1 \| 111 \| 11111 | | Reset network. Same function as a reset button or unplugging the power supply. |
| Response | | | |
| None | | | |

Transmit authority is passed with this command. The network interface receiving this command has transmit authority the instant the command is received. The receiver may decide that it does not need to transmit information to another network interface. In this case, the network interface merely sends the "transmit authority command" on to the next network interface in sequence.

No network interface may retain transmit authority for more than 100 milliseconds in one continuous slice of time. The reason for the timeslice is to give all network interfaces a portion of the network bandwidth. Large sets of data must be broken into small packets in order to meet the time limits for transmit authority retention.

A timeout is necessary to prevent the network from hanging up when the cable 12 breaks or when a network interface that doesn't exist is accessed. If the sender of the HANT command does not see any command on cable 12 for 100 milliseconds or more, the sender network interface assumes that the receiver did not get the HANT command. It is not necessary for the receiver to acknowledge this command directly to the sender, since no one network interface may keep the transmit authority command indefinitely. If the receiver network interface does not need to transmit information, it will send the transmit authority command on to the next network interface, thereby satisfying the previous transmit authority owner's timeout. If the receiver network interface does need to transmit, it will subsequently send an HVCO command to some other network interface.

Get Peripheral Status Command

| Command | | |
|---|---|---|
| Mnemonic | Bit Pattern | Meaning |
| HPSG | 1 \| 001 \| ddddd | This command requests the peripheral status bits of a network interface.<br>ddddd = Destination network interface which is being queried for peripheral status. |

| Response | | |
|---|---|---|
| Mnemonic | Bit Pattern | Meaning |
| | 0 \| f \| e \| v \| sssss | f & e = Internal buffer status.<br>f = 0 Indicates buffer not full.<br>= 1 Indicates buffer full.<br>e = 0 Indicates buffer not empty.<br>= 1 Indicates buffer empty.<br>v = Virtual circuit status.<br>= 0 No virtual circuit open.<br>= 1 Open virtual circuit.<br>sssss = Network interface open with virtual circuit. |
| | 0 \| ppppppp | ppppppp = Physical peripheral status bits of the peripheral device attached to the specified network interface. |

During the operation of a network without host computer software, it is necessary for a network interface to retain both the logical status of a network interface and the physical status of the peripheral attached to a network interface. This command provides a network interface with the ability to rapidly sample the physical status of a peripheral attached to a network interface.

Set Peripheral Status Command

| Command | | |
|---|---|---|
| Mnemonic | Bit Pattern | Meaning |
| HPSS | 1 \| 010 \| ddddd<br>0 \| ppppppp | This command commands the peripheral status bits of a network interface to take on a specific value.<br><br>dddd = Destination network interface which is having its peripheral status bits set.<br><br>ppppppp = Physical peripheral status bits of the peripheral device attached to the specified network interface. |

| Response |
|---|
| None |

During the operation of a network with or without host computer software, it is necessary for a source network interface to physically control the status bits of the destination network interface to which it is connected. With serial devices, the status bits represent "handshaking" signals that are sent back and forth between host computer and peripheral devices. With parallel devices, the status bits may be used to reset a printer attached to the port.

Non-Checksummed Data Transfer

Command

| Mnemonic | Bit Pattern | | | Meaning |
|---|---|---|---|---|
| | 1 | 011 | ddddd | This command transfers a block of data between one network interface and another. Every byte sent after this command which has the ninth bit equal to zero is considered to be a byte for the destination network interface. The destination network interface stops accepting data as soon as it sees a command (data with the ninth bit equal to one) transmitted across the network. This command trades high integrity data transfer for speed. |
| | 0 | 1st byte | | |
| | 0 | . | | |
| | 0 | nth byte | | |

Response

None

This command can be used to transfer data between network interfaces at the highest possible rate. However, the speed thus attained is achieved at the cost of data integrity. When this command is used, the only guarantee of the integrity of the data being transmitted across the network is the ability of the hardware to do so without inducing errors. This command is the default mode for data transfer mechanism, since the cables that now connect host computers and their peripherals have no ability to recover from errors electrically induced in the data being transmitted across the cable. It should be noted that neither host computers nor peripherals may have the ability to detect data transmission errors between one another.

Checksummed Data Transfer

Command

| Mnemonic | Bit Pattern | | | Meaning |
|---|---|---|---|---|
| | 1 | 100 | ddddd | This command transfers a block of data between one network interface and another. However, the data sent with a count and a CRC-16 checksum. This command is primarily intended for data transfer between host computers; although it can be activated for data transfers between host computers and any peripherals. This command trades speed for high integrity data transfer. |
| | 0 | byte cnt | | |
| | 0 | 1st byte | | |
| | 0 | . | | |
| | 0 | nth byte | | |
| | 0 | crc 16 lo | | |
| | 0 | crc 16 hi | | |

Response

| Mnemonic | Bit Pattern | | Meaning |
|---|---|---|---|
| ACK | 0 | 00000110 | Positive acknowledge. The data was transferred without error. |
| NAK | 0 | 00010101 | Negative acknowledge. The data was transferred with error. |

This command is used to transmit data when high integrity of the data being transmitted is crucial. For example, this is the default data transfer mechanism for data being transmitted between host computers. It is an appropriate data transfer mechanism between host computers, since data transmitted between them is possibly file or mail data.

This form of data transmission can also be selected by specifying it as the default data transfer mechanism in the network interface configuration.

Open Virtual Circuit Command

Command

| Mnemonic | Bit Pattern | | | Meaning |
|---|---|---|---|---|
| HVCO | 1 | 101 | ddddd | This command attempts to open a virtual circuit between one network interface and another. |
| | 0 | 000 | sssss | | ddddd = Destination network interface to which a virtual circuit open request is being sent.
sssss = Source network interface requesting virtual circuit open.

Response

| Mnemonic | Bit Pattern | | Meaning |
|---|---|---|---|
| ACK | 0 | 00000110 | Positive acknowledge. The virtual circuit between the network interfaces has been opened. |
| NAK | 0 | 00010101 | Negative acknowledge. The virtual circuit between network interfaces could not be opened. |

This command is sent by a source network interface (i.e. one attached to a host computer) that needs to create a virtual circuit with another network interface (i.e. one attached to a peripheral device or another host computer). The response from the source or destination network interface is used to determine whether the command completed successfully, or whether the command could not be completed due to some previously existing condition.

Only one virtual circuit can exist between a source network interface (a host computer) and a destination network interface (a peripheral device) because destination network interfaces are serially usable resources. A source network interface has exclusive use of a destination network interface until it is finished transferring data or until a condition arises which breaks the virtual circuit between the source and destination network interface. However, a source network interface can establish multiple virtual circuits with other source network interfaces. In this configuration, the source network interface that receives the command passes it to software running on the host computer. The software running on the host computer uses the open command to manage the virtual circuits between itself and other host computers.

Close Virtual Circuit Command

| Command | | | |
|---|---|---|---|
| Mnemonic | Bit Pattern | | Meaning |
| HVCC | 1 101 ddddd<br>0 001 sssss | | This command attempts to close a previously open virtual circuit between two network interfaces.<br><br>ddddd = Destination network interface which is being queried for virtual circuit close.<br>sssss = Source network interface requesting virtual circuit close. |

| Response | | | |
|---|---|---|---|
| Mnemonic | Bit Pattern | | Meaning |
| ACK | 0 00000110 | | Positive acknowledge. The virtual circuit between the network interfaces has been closed. |
| NAK | 0 00010101 | | Negative acknowledge. The virtual circuit between network interfaces could not be closed. This condition arrises when a close is requested on a virtual circuit that was not open. |

The command is sent by a source network interface (attached to a host computer) that needs to break the virtual circuit that exists between it and a source or destination network interface (a host computer or peripheral device). The response from the destination network interface is used to determine whether the command completed successfully, or whether the command could not be competed due to a non-existent virtual circuit.

Virtual Circuit Status Command

| Command | | | |
|---|---|---|---|
| Mnemonic | Bit Pattern | | Meaning |
| HVCS | 1 101 ddddd<br>0 010 xxxxx | | This command requests the status of a virtual circuit between two network interfaces.<br>ddddd = Destination network interface which is being queried for virtual circuit status. |

| Response | | | |
|---|---|---|---|
| Mnemonic | Bit Pattern | | Meaning |
| | 1 000 ddddd<br>0 000 sssss | | Virtual circuit status. No virtual circuit is open. |
| | 1 001 ddddd<br>0 001 sssss | | Virtual circuit status. A virtual circuit is open between the destination network interface ddddd and the source network interface sssss. |

The command is used by software running on a host computer to manage the virtual circuits between itself and other host computers.

The response from the destination network interface is used to determine whether the command completed successfully, or whether the command could not be completed due to a non-existent virtual circuit.

A source network interface (attached to a host computer) can establish multiple virtual circuits with other source network interfaces (attached to a host computer). In this configuration, the source network interface passes the close request to software running on the host computer.

Get Network Interface Config Command

| Command | | | |
|---|---|---|---|
| Mnemonic | Bit Pattern | | Meaning |
| | 1 101 ddddd<br>0 011 xxxxx | | This command requests the configuration of a network interface.<br>ddddd = Destination network interface which is being queried for configuration. |

| Response | | | |
|---|---|---|---|
| Mnemonic | Bit Pattern | | Meaning |
| HGCG | 0 name_0<br>0 name_1<br>0 name_2<br>0 name_3<br>0 name_4<br>0 name_5<br>0 name_6<br>0 name_7 | | 8 character ASCII network interface name. |
| | 0 sw_ver | | network interface software version. |
| | 0 hw_ver | | network interface hardware version. |
| | 0 type | | network interface type (PC parallel, PC serial). |
| | 0 xfer_mode | | network interface-network interface data transfer mode. |
| | 0 time_0<br>0 time_1 | | network interface-network interface virtual circuit timeout (tens-of-milliseconds). |
| | 0 time_0<br>0 time_1 | | network interface-host virtual circuit timeout (tens-of-milliseconds). |
| | 0 time_0<br>0 time_1 | | network interface-peripheral virtual circuit timeout (tens-of-milliseconds). |

The command is used by the network interfaces during start-up to determine which network interfaces are attached to peripherals and whether the network interface is upstream or downstream of them. The command is also used by software running on a host computer to manage the configuration of network interfaces (i.e. their names and the default timeouts).

Set Network Interface Config Commands

| Command | | |
|---|---|---|
| Mnemonic | Bit Pattern | Meaning |
| HGCS | 1 / 101 / ddddd <br> 0 / 100 / — | |
| | 0 / name_0 <br> 0 / name_1 <br> 0 / name_2 <br> 0 / name_3 <br> 0 / name_4 <br> 0 / name_5 <br> 0 / name_6 <br> 0 / name_7 | 8 character ASCII network interface name. |
| | 0 / xfer_mode | network interface-network interface data transfer mode. |
| | 0 / time_0 <br> 0 / time_1 | network interface-network interface virtual circuit timeout (tens-of-milliseconds) |
| | 0 / time_0 <br> 0 / time_1 | network interface-host vitual circuit timeout (tens-of-milliseconds) |
| | 0 / time_0 <br> 0 / time_1 | network interface-periph virtual circuit timeout (tens-of-milliseconds) |

| Response | | |
|---|---|---|
| Mnemonic | Bit Pattern | Meaning |
| ACK | 0 / 00000110 | Positive acknowledge. The network interface configuration has been accepted. |
| NAK | 0 / 00010101 | Negative acknowledge. The network interface configuration has not been accepted. |

The command is used by software running on a host computer to manage the configuration of network interfaces (i.e. their names and the default timeouts). The acknowledge (ACK) is only used to determine whether or not the new configuration has been written to the EPROM 26 successfully. Until the new configuration has been completely written to EPROM 26, the network interface cannot be interrupted because all of its resources are consumed during the update of the EPROM 26.

Virtual Connections

During the normal operations of the present invention, data and control information is passed between nodes on the network. All network interfaces on the network may receive information packets addressed to them. In order for a network interface to transmit an information packet to another network interface, the transmitting network interface must first have received the transmit authority command. If a transmitting network interface has received the transmit authority command and has an information packet that it needs to send to a destination network interface, the transmitting network interface may first establish a virtual connection with the destination network interface. A virtual connection is established when the transmitting network interface sends an "open virtual circuit" (HVCO) command to the destination network interface. Once a virtual connection is established, the destination network interface and the transmitting network interface are paired for the purpose of data transmission. No other transmitting network interface can communicate with the destination network interface to which it is paired. Once the virtual connection is established, the transmitting network interface is free to pass the transmit authority command on to the next network interface in the network. The transmitting network interface will maintain the virtual connection between itself and the associated destination network interface as long as the host computer to which the transmitting network interface is connected continues to provide data for transmission to the destination. The transmitting network interface will maintain a timer to assure that the host computer continues to provide data.

Once the transmitting network interface stops receiving data from its connected host computer, the timeout period will lapse. Once the timeout lapses, the transmitting network interface will break the virtual connection to the destination network interface. At that time, the destination network interface will then be ready to accept data from any other network interface in the network.

Interface Protocol Conversion

Host computers can be connected to the network via serial or parallel network interfaces. Similarly, peripheral devices can be connected to the network by serial or parallel network interfaces. Because of these four possibilities, two classes of connectivity arise. In the simpler case of symmetric connectivity, both sender and receiver network interfaces have identical types of interfaces. In this case, no interface protocol conversion is required, since the interface protocol (status) is bit for bit equivalent between the host computer and the peripheral device.

Interface protocol conversion is required when both the sender and receiver network interfaces have dissimilar host/peripheral interfaces (asymmetric connectivity). The problem in the case of asymmetric connectivity is the non-equivalence of the peripheral and host computer status information. Them is no direct translation between the status bits provided by an RS-232 (serial) interface and the status bits provided by a Centronix (parallel) interface. The methods of the present invention are required to synthesize a status between a parallel and a serial interface. For example, a parallel interface busy signal is converted into an RS-232 (serial) signal equivalent. In the case of a printer peripheral, host computers typically use one or two serial lines to sample a printer's status. These lines translate into printer busy or ready. There is no "off-line" or "out of paper" signal equivalent in the RS-232 serial interface.

Watch Dog Function

The first network interface in the network (network interface address 0) performs the network watch dog function. A watch dog function is necessary to prevent errors from hanging the network. An error could occur during the passing of a transmit authority command between network interfaces. The transmit authority command could be corrupted by some sort of temporary error condition caused by the sending or receiving network interface. If a transmit authority command is not sent, or received garbled, the network could hang. In order to provide a minimum degree of recovery for command passing errors, network interface address 0 performs a network watch dog function. Network interface address 0 monitors network "transmit authority command" (HANT) passing activity. As long as transmit authority commands are being passed between network interfaces on the network, network interface address 0 will take no special action. Whenever network interface address 0 receives a transmit authority command sent by any other network interface on the network, network interface address 0 will start a 100 millisecond timer. This timer will continually be reset every time network interface address 0 receives a new transmit authority command. If no transmit authority commands are passed across the network for a period of greater than 100 milliseconds, network interface address 0 will pass the transmit authority command to the next network interface in the network, namely network interface address 1. This action will reinitiate the passing of transmit authority commands; thus, the network will have recovered from the error condition. This scheme also provides error recovery for malfunctioning network interfaces that do not pass the transmit authority command on to the next network interface as required.

Default Network Interface Assignment

The present invention provides a means for assigning default destination network interfaces associated with each source network interface. Since a host computer is not required to explicitly define the destination of information it transmits, a default destination scheme is required. Default destination network interfaces are set up for each source network interface using the network configuration information that was compiled during network configuration mode described earlier. Using this information, each source network interface is aware of the type of each of the other network interfaces in the network. Thus, each source network interface knows the address of all of the other destination network interfaces. Destination network interfaces are typically connected to peripheral devices. If there is only one destination network interface in the network, each of the other source network interfaces in the network can use the single destination network interface as a default destination. If there is more than one destination network interface in the network, the default assignment becomes more complicated.

During the initialization and self-identification mode described above, the address of each network interface in the network was assigned. The first network interface address in the network is zero. The address of the second network interface is 1, and so on. The value of the network interface addresses are typically the natural sequence of integers. A convention may be defined whereby a network interface with an address value which is less than the address value of a specific network interface is said to be "down stream" of that specific network interface. A network interface with an address value which is greater than the address value of a specific network interface is said to be "up stream" of that specific network interface. Because a group of source network interfaces may be associated with one of several destination network interfaces in the network, the present invention uses the following simple default scheme. If there is a destination network interface up stream from a source network interface or group of source network interfaces, each of those source network interfaces use the first up stream destination network interface. If there is no up stream destination network interface, each of the source network interfaces use the first down stream destination network interface. In this way, a default destination network interface can be associated with each source network interface in the network, thereby achieving a satisfactory balance between simplicity and flexibility.

If, however, a source network interface chooses to explicitly address a particular destination network interface, the present invention provides the capability to do so. The default assignments can be overridden by an explicit address destination.

Although this invention has been shown in relation to a particular embodiment, it should not be considered so limited. Rather, it is limited only by the appended claims.

What is claimed is:

1. A computer network interface device for connecting a node with a computer network and providing distributed control of said computer network, said computer network interface device comprising:

a. means for communicating with another computer network interface device using network signals and network commands, said means for communicating including, i. a network daisy chain interface for use during initialization and self identification of said computer network interface device, and ii. a network bus interface for performing information transfers over said computer network;

b. a controller for interpreting and responding to said network signals and network commands, said controller coupled to said network daisy chain interface and said network bus interface, said controller further including, iii. dynamic self-identification means including means for determining a unique address of said computer network interface device in relation to another computer network interface device in said computer network, said means for determining including means for determining if said computer network interface device is a first computer network interface device in said computer network and mean for determining if said computer interface device is a last computer interface device, said first computer network interface device having no other computer network interface device connected to a self-identification input of said network daisy chain interface, said means for determining a unique address referencing said unique address from a dynamically generated address of said first computer network interface device, said dynamic self-identification means further including means for receiving an address of said computer network interface device via said network bus interface as dynamically generated by said another computer network interface device, said computer network interface device further including means for responding only to said network commands having said address dynamically generated by said another computer network interface device, iv. means for generating a transmit authority command in the form of a token with which said computer network interface obtains the right to transmit data on said computer network via said network bus interface after said address of said computer network interface device has been received by said means for receiving, v. means for issuing said transmit authority command to any other computer network interface device of said computer network, and vi. means for interpreting a transmit authority command generated by said any other computer network interface device of said computer network, and vii. means for granting permission to transmit information on said computer network in response to interpreting said transmit authority command;

viii. means for associating a default destination with the computer network interface device;

ix. means for establishing a virtual circuit between the computer network interface device and a destination when the computer network interface device has the transmit authority x. means for maintaining the virtual circuit after issuing the transmit authority to another computer network interface device; and c. a node interface for transferring information between said computer network and said node.

2. The computer network interface device of claim 1 wherein said node interface is a parallel data interface.

3. The computer network interface device of claim 1 wherein said node interface is a serial data interface.

4. The computer network interface device of claim 1 further including watch dog timer means comprising:

means for detecting a failure in said computer network by determining if said transmit authority command has not been received by said computer network interface device for a predetermined timeout period; and means for correcting a failure in said computer network by re-issuing said transmit authority command.

5. The computer network interface device of claim 1 further including a non-volatile memory for storage of network configuration data and network interface configuration data.

6. The computer network interface device of claim 1 further including means for coupling said computer network interface device to an external power source thereby providing power to said computer network interface device and any other computer network interface device in said computer network.

7. The computer network interface device of claim 1 wherein said network daisy chain interface comprises two conducting connections.

8. The computer network interface device of claim 1 wherein said network bus interface comprises two conducting connections.

9. The computer network interface device of claim 1 wherein the node interface accepts both incoming parallel and serial data.

10. In a computer network interface device having means for connecting a node with a computer network, a process for controlling said computer network interface device comprising the steps of:

dynamically determining a unique address of said computer network interface device in relation to another computer network interface device in said computer network;

determining if said computer network interface device is a first computer network interface device in said computer network, said first computer network interface device having no other computer network interface device connected to a self-identification input of a network daisy chain interface, said determining step further including a step of referencing said unique address from a dynamically generated address of said first computer network interface device;

receiving an address of said computer network interface device via said computer network as dynamically generated by another computer network interface device, responding only to said network commands having said address dynamically generated by said another computer network interface device:

generating a transmit authority command in the form of a token with which said computer network interface obtains the right to transmit data on said computer network via said network bus interface after said address of said computer network interface device has been received in said receiving step;

issuing said transmit authority command to any other computer network interface device of said computer network;

interpreting a transmit authority command generated by said any other computer network interface device of said computer networks associating a default destination with the interface if no destination is specified;

granting permission to transmit information on said computer network in response to interpreting said transmit authority command;

establishing a virtual circuit between the computer network interface device and a destination while the computer network interface device has transmit authority; and maintaining the virtual circuit after issuing the transmit authority to another computer network interface device.

11. The process of claim 10 including a step of receiving parallel data from said node.

12. The process of claim 10 including a step of receiving serial data from said node.

13. The process of claim 10 further including the steps of:

detecting a failure in said computer network by determining if said transmit authority command has not been received by said computer network interface device for a predetermined timeout period; and correcting a failure in said computer network by re-issuing said transmit authority command.

14. The process of claim 10 further including a step of storing network configuration data and network interface configuration data in a non-volatile memory.

15. The process of claim 10 further including the steps of:

assigning a default destination computer network interface device;

determining if an address of a valid computer network interface device is specified in a network command; and routing said network command to said default destination computer network interface device if an address of a valid computer network interface device is not specified in said network command.

* * * * *

UNITED STATES PATENT AND TRADEMARK OFFICE
CERTIFICATE OF CORRECTION

PATENT NO.    : 5,535,336
DATED         : July 9, 1996
INVENTOR(S)   : Smith et al.

It is certified that error appears in the above-identified patent and that said Letters Patent is hereby corrected as shown below:

In the Title page at [75] delete "Kruegeer" and insert --Krueger--

In column 15 at line 50 delete "cut" and insert --cnt--

In column 20 at line 39 delete "Them" and insert --There--

Signed and Sealed this

First Day of July, 1997

Attest:

BRUCE LEHMAN

Attesting Officer

Commissioner of Patents and Trademarks